June 11, 1946.    C. SPRINGHORN    2,401,982
GOVERNOR CLUTCH MECHANISM
Filed Jan. 24, 1945    2 Sheets-Sheet 1

INVENTOR.
Charles Springhorn,
BY George D. Richards
Attorney

June 11, 1946. C. SPRINGHORN 2,401,982
GOVERNOR CLUTCH MECHANISM
Filed Jan. 24, 1945 2 Sheets-Sheet 2

INVENTOR.
Charles Springhorn,
BY George L. Richards
Attorney

Patented June 11, 1946

2,401,982

UNITED STATES PATENT OFFICE 2,401,982

GOVERNOR CLUTCH MECHANISM

Charles Springhorn, Orange, N. J., assignor to Metal Textile Corporation, West Orange, N. J., a corporation of Delaware Application January 24, 1945, Serial No. 574,361

2 Claims. (Cl. 192—18)

This invention relates to improvements in governor clutch mechanism adapted for various uses, but especially effective for actuating and controlling the operation of winding reels, spools and the like.

In winding wire, yarn, thread or other filamentary material onto reels, spools or the like, especially when the filament is under tension, undue acceleration or over-running of the reel, spool or the like is likely to part the filament, thus not only interrupting the winding operation, but also requiring objectionable and sometimes prohibitive tying, splicing or knotting of the filament.

Having this in view, it is an object of this invention to provide novel means for transmitting winding power to a reel, spool or the like, which means includes a combined governing clutch and braking mechanism adapted to control the winding speed of the reel, spool or the like whereby to prevent undue acceleration or over-running thereof, which mechanism is itself automatically controlled by the tension of the filament moving toward the reel, spool or the like to be wound thereon.

A more specific object of the invention is to provide a novel governor clutch mechanism of the kind stated for controlling the winding speed of a reel, spool or the like upon which wire issuing from flattening rolls is to be wound, whereby the tension of the flattened wire, moving between the flattening rolls and reel, spool or the like, is applied to a lever system by which the clutch and brake means of said governor clutch mechanism is automatically operated.

Other objects of this invention, not at this time more particularly enumerated, will be understood from the following detailed description of the same.

Figure 1:
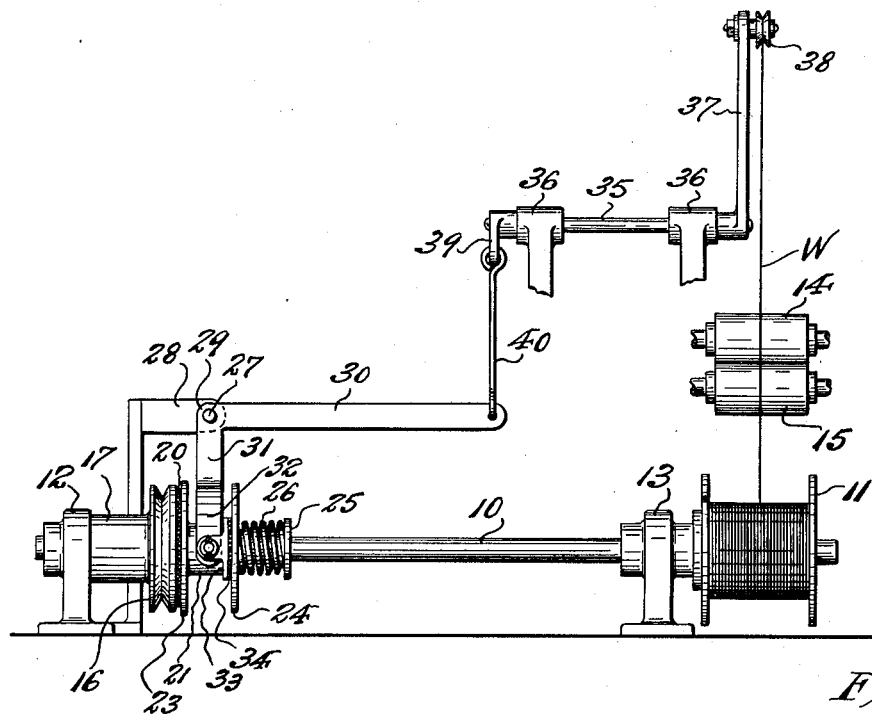
Figure 2:
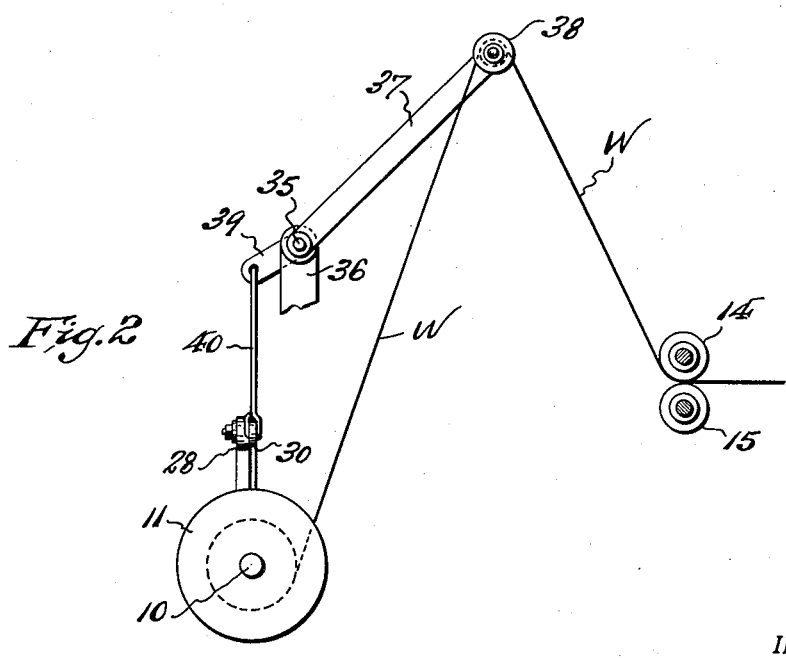
Figure 3:
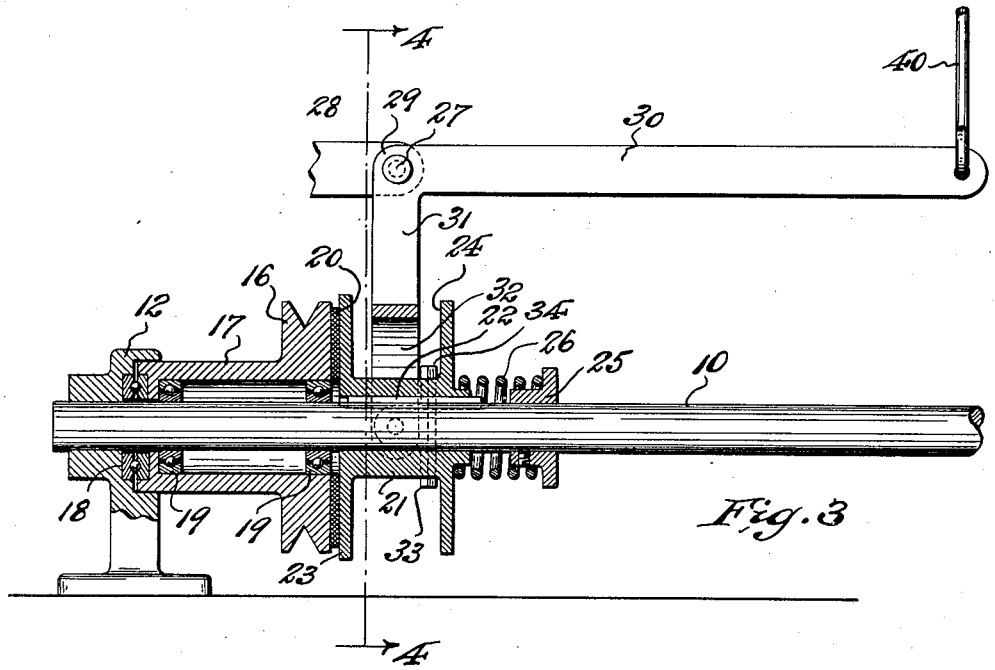
Figure 4:
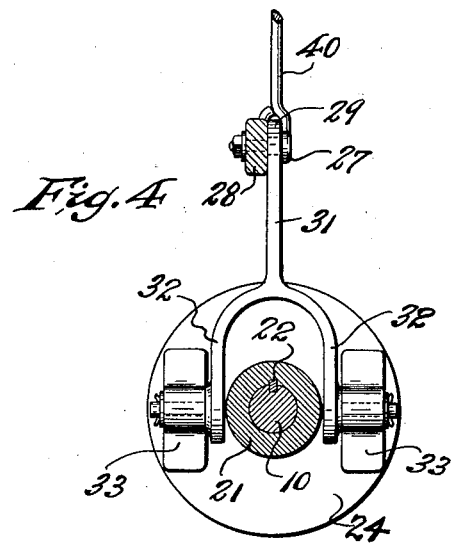

An illustrative embodiment of this invention is shown in the accompanying drawings, in which:

Fig. 1 is an elevational view of the governor clutch mechanism according to this invention as related to a pair of wire flattening rolls from which issues flattened wire to be wound on a reel or spool controlled by said mechanism; Fig. 2 is an end elevational view of the same as viewed from the right in Fig. 1; Fig. 3 is a longitudinal sectional view through the combined clutch and brake means of the mechanism, this view being drawn on an enlarged scale; and Fig. 4 is a fragmentary cross-sectional view, taken on line 4—4 in Fig. 3.

Similar characters of reference are employed in the above described views, to indicate corresponding parts.

Referring to the drawings, the reference character 10 indicates a driven shaft for rotating a reel or spool 11 whereby to wind thereon a filament led thereto. Any suitable means may be provided for detachably affixing said reel or spool 11 to an end of said drive shaft. Said driven shaft 10 is journaled in suitable supporting bearings, such e. g. as the bearing pedestals 12 and 13.

In the illustrative embodiment of this invention as shown, the reel or spool 11 and its driving and control mechanism is located to suitably dispose the reel or spool for reception of a wire filament issuing from a pair of suitably driven flattening rolls 14—15, whereby the round wire passed between the latter rolls and flattened thereby may be wound onto said reel or spool.

The governor clutch mechanism for controlling the winding speed of the reel or spool 11 comprises a driving pulley 16 or the like to which power may be suitably transmitted from a source thereof. Said driving pulley 16 is loosely mounted on the driven shaft 10 so as to turn freely thereon. Said driving pulley is also suitably backed against longitudinal displacement on said driven shaft 10, and for this purpose, as shown, its hub 17 thrusts against the bearing pedestal 12, and is preferably supported by a thrust bearing 18 of an anti-friction type. It is also preferable to provide anti-friction bearings 19 between the driving pulley and the driven shaft. Affixed to the exposed face of said driving pulley 16 is a clutch facing 20 of suitable frictional material.

Mounted on the driven shaft 10, adjacent to the exposed face of the driving pulley 16, is a sleeve 21. Said sleeve 21 is keyed to the driven shaft 10 by a key or spline 22 so that it turns with the shaft, but is nevertheless free to shift longitudinally thereon. Said sleeve 21 is provided at one end with an annular clutch disc 23 to oppose and engage the clutch facing 20 of the driving pulley 16. At its opposite end, said sleeve 21 is provided with an annular brake disc 24. Fixed on the driven shaft 10, beyond and spaced from said sleeve 21, is a stop or fixed thrust collar 25. Arranged around the driven shaft 10, between said collar 25 and the end of the sleeve 21 opposed thereto, is a compression spring 26. This spring 26 urges the sleeve 21 toward the driving pulley 16, whereby to normally thrust the clutch disc 23 into clutching frictional engagement with the clutch facing 20 of the driving pulley, and thus to normally clutch the sleeve to the driving pulley, so that driving torque is applied therethrough to the driven shaft 10 and thus to the reel or spool 11 mounted on said shaft.

Fulcrumed by a pivoting stud 27 on a stationary support 28 which is adjacently disposed relative to the sleeve 21 is a bell-crank lever 29 provided with a horizontal arm 30 and a vertical arm 31. Said vertical arm 31 terminates in a fork section, the arms 32 of which straddle said sleeve 21 intermediate its clutch disc 23 and brake disc 24. Pivotally connected respectively to the respective arms 32 of said fork section are brake shoes 33. Said brake shoes 33 are provided on their operative faces with linings 34 of suitable frictional material adapted to oppose and, at proper times, to engage the inner face of the brake disc 24 carried by the sleeve 21.

Located adjacent to and intermediate the wire flattening rolls 14—15 and the reel or spool 11 is a rock-shaft 35 journaled in suitable bearing supports 36. Affixed to one end of said rock-shaft 35 is an upwardly inclined lever arm 37, upon the free end portion of which is mounted a wire guide roller 38. The flattened wire W issuing from the flattening rollers 14—15 is led to and passes over said wire guide roller 38, passing thence to the reel or spool 11. Affixed to the opposite end of said rock-shaft 35 is a downwardly inclined lever arm 39, the free end portion of which is connected to the free end portion of the horizontal arm 30 of the bell-crank lever 29 by a link 40.

In operation, power is transmitted to the driving pulley 16. Normally, the compression spring 26 thrusts the sleeve 22 toward the rotating driving pulley 16 so that its clutch disc 23 is forced into frictionally clutched engagement with the clutch facing 20 of said driving pulley, and consequently the sleeve 22 is caused to rotate with the latter. Said sleeve 22 being keyed to the driven shaft 10, rotation of the former is transmitted to the latter, and the reel or spool 11 is rotated to wind thereon the wire W as it issues from the flattening rolls 14—15. During such operation should the speed of the reel or spool 11 unduly accelerate or tend to over-run the speed at which the wire W issues from said flattening rolls, the increased tension of that section of the wire W which is looped over the wire guide roller 38 exerts a downward pull upon the lever arm 37 whereby to rock the rock shaft 35 and thus up-swing the lever arm 39. Such up-swinging of the lever arm 39 is transmitted through the link 40 to the bell-crank lever 29 so as to turn the same anti-clockwise about its pivotal support 27. Said movement of the bell-crank lever 29 moves the brake shoes 33 into engagement with the brake-disc 24, whereby to both thrust back the sleeve 22 against the tension of the compression spring 26 and thereby release the clutch-disc 23 from normal clutched engagement with the driving pulley 16, while at the same time exerting a frictional braking drag of said brake shoes 33 upon the brake disc 24. As a consequence of this, the driven shaft 10 is released from the driving torque of said driving pulley 16, and simultaneously the rotative speed of the driven shaft 10 and the reel or spool 11 mounted thereon is quickly retarded, and the tension on the wire W is consequently quickly relaxed. Upon relaxation of the tension of the wire W, the compression spring 26 is again permitted to exert forward thrust upon the sleeve 22, to again return the clutch disc 23 to clutched relation to the driving pulley 16, while at the same time relaxing the braking effect of the brake shoes 33 and returning the bell-crank lever 29 and the lever system 38—39 to normal positions. Upon such occurrence the driven shaft 10 and the reel or spool 11 are again subjected to driving torque for continuing the winding of the wire W onto the reel or spool 11. The described cycle of operations is constantly repetitive and is automatic, and consequently precise and effective control is exercised upon the winding action of the reel or spool 11 throughout the wire winding operation thereof.

While I have shown and described the novel governor clutch mechanism as specifically applied to winding mechanism, it will be obvious that it may be used in other types of apparatus wherein a constant and automatic control of applied power and speed is desirable.

I am aware that some changes could be made in the above described constructions, and that widely different embodiments of this invention could be made without departing from the scope thereof as defined by the herefollowing claims. It is therefore intended that all matter contained in the foregoing description and shown in the accompanying drawings shall be interpreted as illustrative and not in a limiting sense.

I claim:

1. A governor clutch mechanism comprising a driven shaft, a driving pulley freely rotatable on said shaft, a member keyed to but longitudinally shiftable on said shaft adjacent to said driving pulley, said member having a clutch disc at the end thereof opposed to said driving pulley and a brake disc at its other end, compression spring means to urge said member toward said driving pulley whereby to normally engage its clutch disc in clutched relation to the latter, and a pivoted lever means provided with brake shoe means to oppose the inner face of said brake disc, said lever means being operable to thrust said brake shoe means into braking engagement with said brake disc and simultaneously move said member against the tension of said compression spring so as to release said clutch disc from clutched engagement with said driving pulley.

2. A governor clutch mechanism comprising a driven shaft, a driving pulley freely rotatable on said shaft, a member keyed to but longitudinally shiftable on said shaft adjacent to said driving pulley, said member having a clutch disc at the end thereof opposed to said driving pulley and a brake disc at its other end, compression spring means to urge said member toward said driving pulley whereby to normally engage its clutch disc in clutched relation to the latter, a pivoted lever means provided with brake shoe means to oppose the inner face of said brake disc, and means to actuate said lever means whereby to thrust said brake shoe means into braking engagement with said brake disc and simultaneously move said member against the tension of said compression spring so as to release said clutch disc from clutched engagement with said driving pulley.

CHARLES SPRINGHORN.